United States Patent [19]
Ament

[11] Patent Number: 4,836,263
[45] Date of Patent: Jun. 6, 1989

[54] WINDOW SHADE OR SCREEN APPARATUS, PARTICULARLY FOR VEHICLE WINDOWS

[75] Inventor: Eduard Ament, Aichwald, Fed. Rep. of Germany

[73] Assignee: Baumeister & Gatler, Aichwald, Fed. Rep. of Germany

[21] Appl. No.: 34,399

[22] Filed: Apr. 2, 1987

[30] Foreign Application Priority Data

Apr. 11, 1986 [DE] Fed. Rep. of Germany ....... 3612165

[51] Int. Cl.$^4$ .............................................. E04F 10/06
[52] U.S. Cl. ...................................... 160/68; 160/71; 160/370.2; 296/152
[58] Field of Search ........................ 160/66, 67, 68, 69, 160/70, 71, 72, 73, 74, 75, 22, 62, DIG. 2, DIG. 3, DIG. 4, 310; 296/97 G, 97 J, 99 R; 135/88, 89

[56] References Cited

U.S. PATENT DOCUMENTS

| | | | |
|---|---|---|---|
| 1,180,124 | 4/1916 | Foedish et al. | 296/99 X |
| 1,583,860 | 5/1926 | Simmons | 296/97 G X |
| 1,594,643 | 10/1924 | Stuart . | |
| 1,630,416 | 5/1927 | Clementi et al. | 160/72 |
| 1,749,197 | 3/1930 | Stuart | 160/70 X |
| 1,890,406 | 12/1932 | Pollard | 160/70 X |
| 1,944,454 | 1/1934 | Park | 160/311 X |
| 2,071,272 | 2/1937 | O'Shea | 160/68 X |
| 2,079,073 | 4/1936 | Knoll . | |
| 2,794,498 | 6/1957 | Heckerman | 160/62 |
| 4,398,585 | 8/1983 | Marlow | 160/290 R X |

FOREIGN PATENT DOCUMENTS

| | | | |
|---|---|---|---|
| 3146169 | 5/1983 | Fed. Rep. of Germany | 296/99 R |
| 3345503 | 6/1985 | Fed. Rep. of Germany | 296/97 G |
| 3413966 | 10/1985 | Fed. Rep. of Germany | 296/97 J |
| 3415930 | 10/1985 | Fed. Rep. of Germany | 296/97 J |
| 3226400 | 2/1987 | Fed. Rep. of Germany . | |
| 2588307 | 4/1987 | France | 296/97 G |
| 580217 | 8/1946 | United Kingdom . | |
| 1304823 | 1/1973 | United Kingdom | 160/66 |
| 3532013 | 3/1987 | United Kingdom . | |

Primary Examiner—Ramon S. Britts
Assistant Examiner—David M. Purol
Attorney, Agent, or Firm—Frishauf, Holtz, Goodman & Woodward

[57] ABSTRACT

A window screen or shade, in particular for motor vehicles, includes a wind-up roller biassed in the wind-up direction that is rotatably journalled in a base and on which shade or screen web is secured with one end. The other edge of the web is mounted in an end rail, which is engaged by at least one extension element of an extension structure located in the vicinity of the wind-up roller, in order to unwind the web counter to the biassing of the spring mechanism for the wind-up roller. To enable dispensing with additional guide elements for the end rail, which support the window shade in the direction at right angles to the spread-open web, the extension element is substantially rigid, at least in a direction at right angles to the plane of the web defined by the extended web, and when the web is extended can move in a plane parallel to this plane of the web.

20 Claims, 10 Drawing Sheets

WINDOW SHADE OR SCREEN APPARATUS, PARTICULARLY FOR VEHICLE WINDOWS

The present invention relates to a shade or sunscreen, and more particularly to a roll-up shade for use in vehicles, especially automotive vehicles.

Roll-up shades or sunscreens are frequently used in automotive vehicles to shield sunlight from the inside of the vehicle. The shade material may be transparent, or at least one-way transparent, to permit the operator to see through the shade, for example rear and lateral traffic, while being shielded from sunlight or glare. In the specification that follows, the shade will be referred to as a "web" and it is to be understood that this term is to encompass opaque as well as translucent or sunscreening or one-way transparent reflective material, in short, any material which can be used with a roll-up structure adjacent a window. The apparatus is particularly suitable for installation on the rear window shelf of a passenger automobile.

BACKGROUND

A roll-up shade or screen of this kind is known from German Patent Disclosure Document No. DE-OS 32 26 400. This shade includes a box-like base in which not only the wind-up roller but also the operating means for remote-control extension of the web is housed. The web is extended with a flexible-elastic slide member, the free end of which is connected to the end rail of the web and which can be advanced alongside the window in a slotted tube by the operating means. The tube accordingly assumes the guide function when the web is being extended and assures that the web will be properly located in front of the window it is intended to protect.

This construction, which has proved quite satisfactory in practice, avoids having operating and extension structures that would be necessary at the other end of the web, opposite the wind-up roller. Accordingly, there is no loss of head room for the passengers in a motor vehicle in which the known window shade is located before a sharply inclined rear window of the vehicle.

With the known construction, non-factory or custom installation is also facilitated substantially.

However, in the known window shade the guide tube always remains in view, regardless of whether the web is extended or rolled up.

Furhtermore, the known window shade cannot be used in motor vehicles of the hatchback type, because then when the hatch is opened the spacing between the rear window shelf and the upper edge of the rear window changes, which would cause the guide tube to pull out of its upper holding element.

THE INVENTION

It is an object to provide a window shade, light- or sunscreen, or the like, which is particularly adapted for use in automotive vehicles and in which the entire shade or screen apparatus is so constructed that stiff or rigid guide elements extended parallel to the web of the apparatus need not be installed in the vehicle.

Briefly, a web of the desired material is rolled on a roller, retained in a roller retention structure. In accordance with a feature of the present invention, the web is retained in extended position by being attached to a rail which can be held from the roller by an extension structure, typically including a pair of folding links or telescoping rods which are resistant to bending in a plane perpendicualr to the plane of the web when the web is extended. The structure is movable by a motor to move conjointly in synchronism, in a plane parallel to said plane when the web is to be extended, for example by forming the extension structure in the form of foldable links or a telescoping rods. This extension structure solely guides the end support rail of the web and moves the end support rail between a retention position, in which the support rail is adjacent the wind-up roller for the web, and an extended position in which the web is extended. The extension structure retains the web and the end rail then in a predeterminded orientatiopn in a plane perpendicular to said plane of the web when it is extended and parallel to the roller.

In accordance with a feature of the invention, the extension structure comprises relatively stiff arms or links or a telescoping rod which is rigidly extensible.

The use of the rigid extension structure, which when the web is extended moves in a plane prallel to the web, makes it possible to avoid rigidly installed guide devices, which define the travel of the end rail, in the motor vehicle. The movement path of the end rail, in the novel window shade, is fixed in its longitudinal direction by the lateral rigidity of the web in this direction, while the travel at right angles thereto is defined by the movement path of the extension structure. For this reason, the end is also compulsorily guided in two directions at righ angles to one another even when there are no guide members.

On the other hand, with the web retracted the extension structure is retracted along with it and hence is out of sight, because it is always located between the wind-up roller and the end rail.

Because there are no rigid guide members for the end rail, the novel window shade can also be used in hatchback type vehicles, because at least in the retracted state there is no connection between parts of the window shade and the hatch, if the window shade is located on the rear shelf.

DETAILED DESCRIPTION

Figure 1:
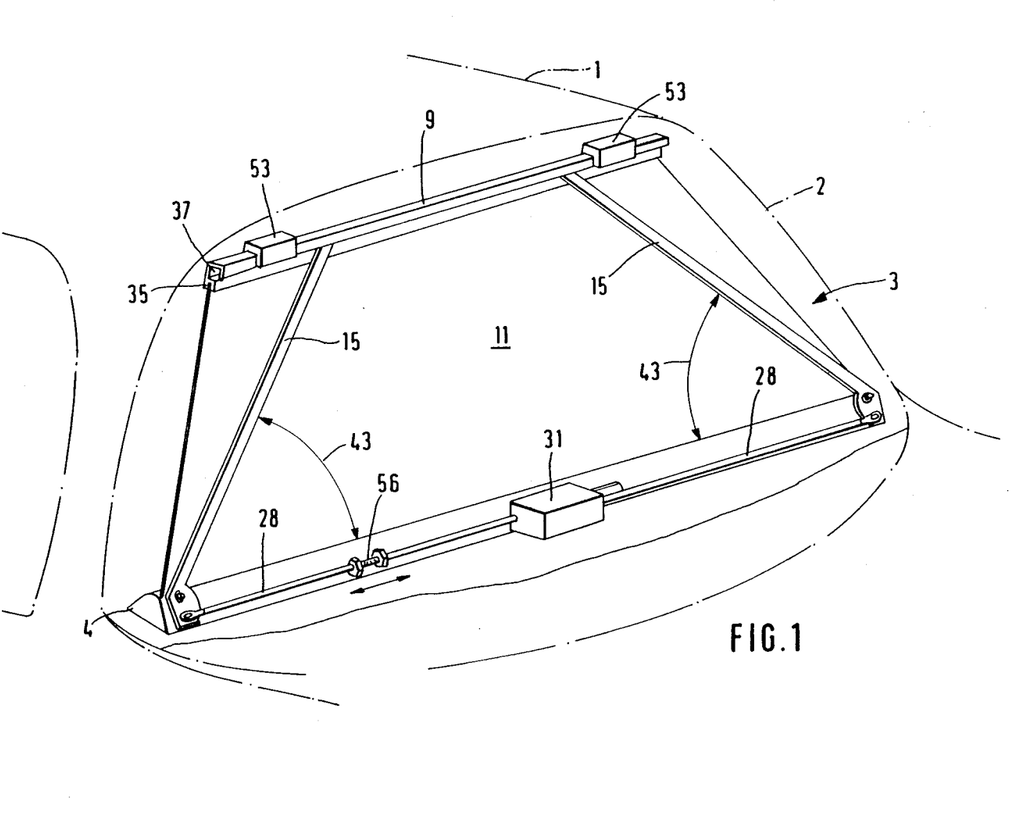
FIG. 1 is a perspective view of a window shade, disposed in a motor vehicle, having two lever elements moved in opposite directions for actuating the end rail.
Figure 2:
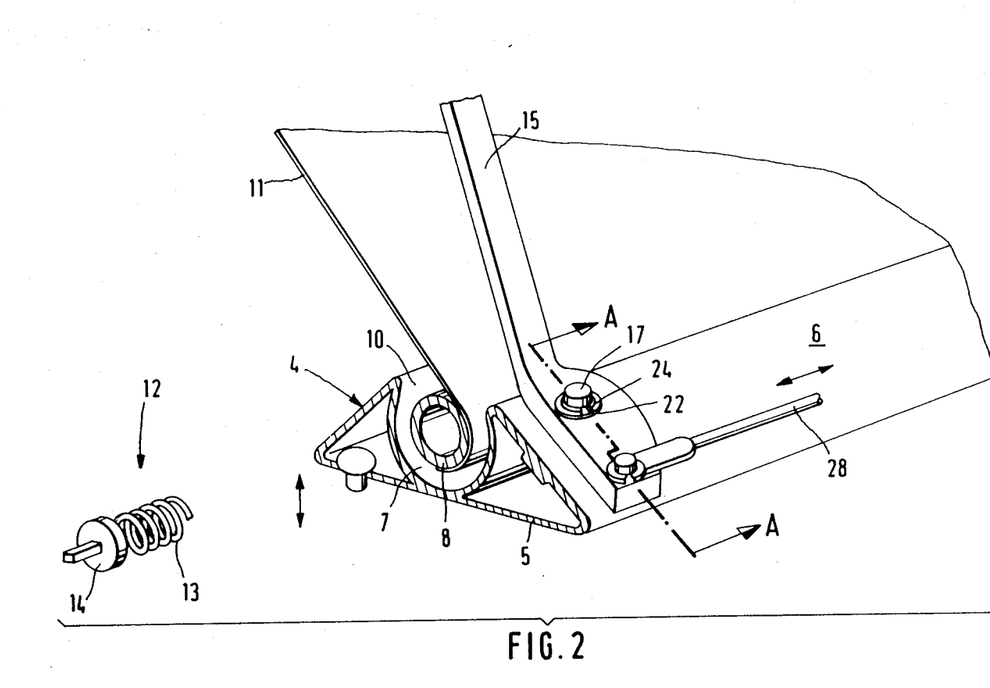
FIG. 2 is a perspective view, on a larger scale, of the journal of one of the two lever elements, the view being partly exploded to show the tension spring.

In FIG. 1, dot-dash lines schematically show the rear portion of a motor vehicle 1, in which a window shade 3 is disposed before the rear window 2 in the interior of the vehicle 1; in FIG. 1, the window shade is shown in the extended position. The window shade 3, as shown in FIG. 2, includes a continuous base 4 of approximately triangular cross section, with an underside 5 and a side wall 6 extending obliquely to the underside 5. On the end side, the base 4, which is to be secured for instance by means of screws on the rear window shelf, includes a groove 7 of approximately cylindrical cross section extending over the entire length of the base, and located in this groove is a tubular wind-up roller 8 journalled at its ends in the base 4. The groove 7 opens upward, that is, away from the bottom surface 5, in a slot 10 bordering on the side wall 6.

On the outside of the wind-up roller 8, a shade or screen web 11 is secured with one edge, its opposite edge being mounted in an end rail 9 (see FIG. 1), which extends parallel to the longitudinal axis of the wind-up roller 8 in every operating position of the window shade 3.

On the inside of the wind-up roller 8 is a spring motor 12, which has a spiral spring 13 of which one end is anchored in the tubular wind-up roller 8 and the other end is mounted in a journal element 14 that is secured in the base 4 so that it cannot rotate. By means of this spring motor 12, the wind-up roller 8 is biassed in the direction of winding-up the web 11 on the wind-up roller 8, so that if no external forces are engaging the end rail 9, the end rail is retained by the force of the spring motor 12 resting on the slot 10, because the web 11 is rolled up.

For extending the web 11 and keeping it spread open, two two-armed lever elements 15 are pivotably journalled on the obliquely extending side wall 6, in the vicinity of the ends of the base 4. The two lever elements are identical except that they are mirror-symmetrical to one another, and with their free ends protruding from the journals on the base 4 they extend in a groove of the end rail 9. Because the two lever elements 15 are otherwise identical, it will suffice for only one of these lever elements to be described in detail below together with a description of its journalling. The journalling is shown in detail in FIGS. 2 and 3.

Figure 3:
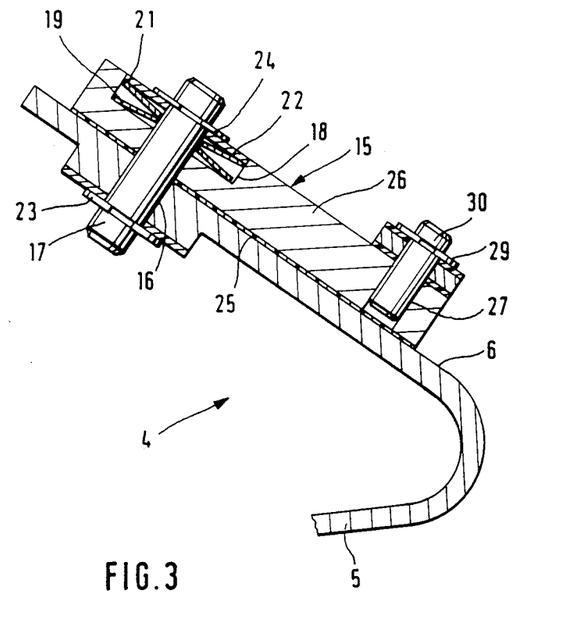
FIG. 3 is a section taken through the journal of FIG. 2 along the line A—A of FIG. 2.

For journalling each of the two lever elements 15, a cylindrical pivot pin 17 is seated in the vicinity of the corresponding end of the base 4 in a bore 16 in the side wall 6, and the corresponding lever element 15 is mounted, with a stepped bore 18 for this purpose, on the pivot pin. The smaller diameter of the stepped bore 18 corresponds to the outer diameter of the pivot pin 17, while the region having the greater diameter serves to receive two disk springs 19 and 21, of which the disk spring 19 is supported on the annular shoulder of the stepped bore 18, while the disk spring 21 is supported on a shim 22 located in the stepped bore 18. In order to keep the two disk springs 19 and 21 biassed, the pivot pin 17 has two wave-type retention washers 23 and 24 in corresponding grooves. The washer 23 presses against the back side of the wall 6, and the washer 24 presses against the outside of the shim 22. In this manner, the lever element 15 is continuously biassed in the axial direction of the cylindrical pin 17 toward the outside of the wall 6, and to reduce friction between the plane underside of the lever element 15 and the plane upper side of the wall 6, a plastic lining 25 is provided.

Pivoting of the lever element or the lever elements 15 is effected via an arm or extension 26, which protrudes in the radial direction beyond the pivot pin 17.

In the end of the arm 26 located remote from the pivot pin 17, a cylindrical crank pin 30 is mounted, for example with a press fit, in a bore 27 that is axially parallel to the stepped bore 18. A coupling rod 28 is pivotably mounted on the portion of the crank pin 30 that protrudes upward out of arm 26. To prevent the coupling rod 28 from sliding away from the crank pin, the crank pin 30 has a wave-type retention washer 29 in a corresponding groove, which fixes the coupling rod 28 between the washer 29 and the outwardly pointing top of the arm 26. The coupling rod 28 leads to an operating means 31, which is secured approximately in the middle between the two pivot pins 17 for the two lever elements 15 on the wall 6 of the base 4. By means of this operating means 31, the two coupling rods 28 leading to the lever elements 15 can be moved in opposite directions in their longitudinal direction, so as to rotate the arm 26 of the associated lever element 15 about the pivot pin 17 to a limited extent.

Figure 4:
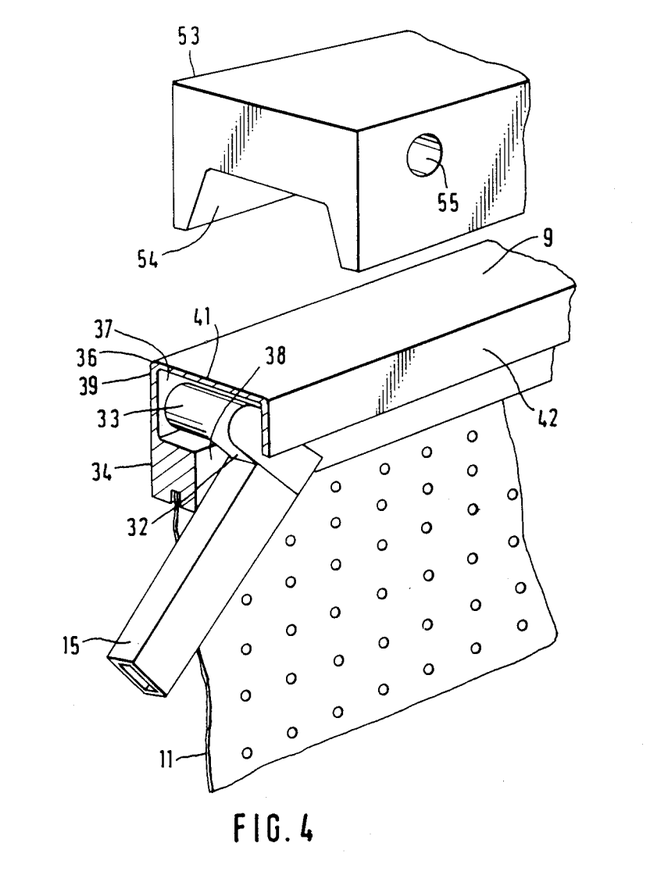
FIG. 4 is a perspective view, on a larger scale, of the free end, sliding in the end rail, of one of the lever elements of the window shade of FIG. 1.

To provide for favorable force ratios in the course of the extension effected via the coupling rods 28, the arm 26 of the lever element 15 is embodied such that the normal which intersects the bore 27 and the stepped bore 18 is inclined relative to a straight connecting line that leads from the axis of the stepped bore 18 to the free end of the lever element 15 extending in the groove. The inclination angle is selected such that if the two lever elements 15 extend approximately parallel to the wind-up roller 8, which is the case in the retracted state of the window shade 3, then the normal that intersects the two axes of the stepped bore 18 and the bore 27 forms an angle of approximately 70° to 80° with the associated coupling rod 28. The guidance of the lever element 15 in the end rail 9 is shown on a large scale in FIG. 4. The lever elements 15, only one of which is shown in FIG. 4 for the sake of simplicity in the drawing, have a plastic molded element 32 on their free ends remote from the pivot pin 17, and this element 32 is inserted with a pin into the lever element 15 from the face end side. At right angles to this, the plastic molded element 32 has a preferably cylindrical extension 33, which protrudes toward the web 11 from the plastic molded element 32 and is approximately axially parallel with the pivot pin 17. As FIG. 4 shows, this extension 33 is offset upward with respect to the lever element 15, that is, in the direction toward the extension of the web 11; as a result, when the end rail 9 is resting on the slot 10, when the window shade 3 is retracted, the lever elements 15 are capable of resting with their long arm extending between the plastic molded element 32 and the pivot pin 17, in an unhindered manner, approximately parallel to the end rail 9 or wind-up roller 8.

The end rail 9 has the cross-sectional profile also shown in FIG. 4 and comprises a rail 34 of approximately rectangular cross section, which on one long side includes a slot 35, which is visible for example in FIG. 1 and into which the web 11 is inserted with its front edge and retained there. On the rear side, oriented away from the web 11, a wall 36 (see FIG. 4) is integrally formed onto the rail 34 and fits over the rear side of the bar 34 in a gable-like fashion, resulting in a hollow space 37 of approximately rectangular cross section extending over the entire length of the end rail 9; the hollow space 37 is accessible from below only via a slot 38, which is located beside the side face of the bar 34 and is open toward the wind-up roller 8. The hollow space 37 is therefore defined by the rear side of the bar 34, by a rear side 39, by a top 41, and by a front side 42 of the wall 36, and forms the groove for the free end of the lever elements 15.

In the elongated hollow space 37, the extension 33 is guided in a longitudinally slidable manner with slight play in the longitudinal direction with respect to the end rail 9, and the neck portion of the plastic molded element 32, which joins the extension 33 to the pin mounted in the lever element 15, extends through the slot 38 that is open at the bottom and into the groove-like hollow space 37. Because of the offset arangement of the plastic molded element 32, the resultant force between the lever element 15 and the end rail 9 is operative in the prolongation of the web 11, which largely prevents the tilting of the end rail 9 relative to the web and on the lever elements 15. On the other hand, the end rail 9 cannot slide downward from the extensions 33 in the axial direction of the cylindrical extension 33 either, because in that case the front side 42 would rest on the plastic molded element 32 in the prolongation of the cylindrical extension 33. The end rail 9 and the lever elements 15 in this embodiment are positively connected to one another in two directions, namely in the direction parallel to the unwinding direction of the web 11 and in a direction that is upright on the web plane formed by the extended web 11.

Since the arm of each of the lever elements 15 that extends between the plastic molded element 32 and pivot pin 17 extends at right angles to the axis of the pivot pin 17, pivoting of the lever elements 15, as indicated by the double arrows 43 in FIG. 1, results in an extension of the web 11 out of the base 4 in a plane that intersects the two pivot pins 17 of the two lever elements 15 at right angles. In the embodiment shown, the wall 6 therefore also has an inclination equal to the inclination of the extended web 11 relative to the horizontal, if the base 4 is mounted with its underside 5 on a horizontal surface. The wall 6 along with the plastic lining 25 forms a guide surface of correspondingly large area for the lever elements 15, which are enlarge as shown in FIG. 2 in the vicinity of the pivot pin. The result is a very sturdy guidance which does not tend to vibrate.

Figure 5:
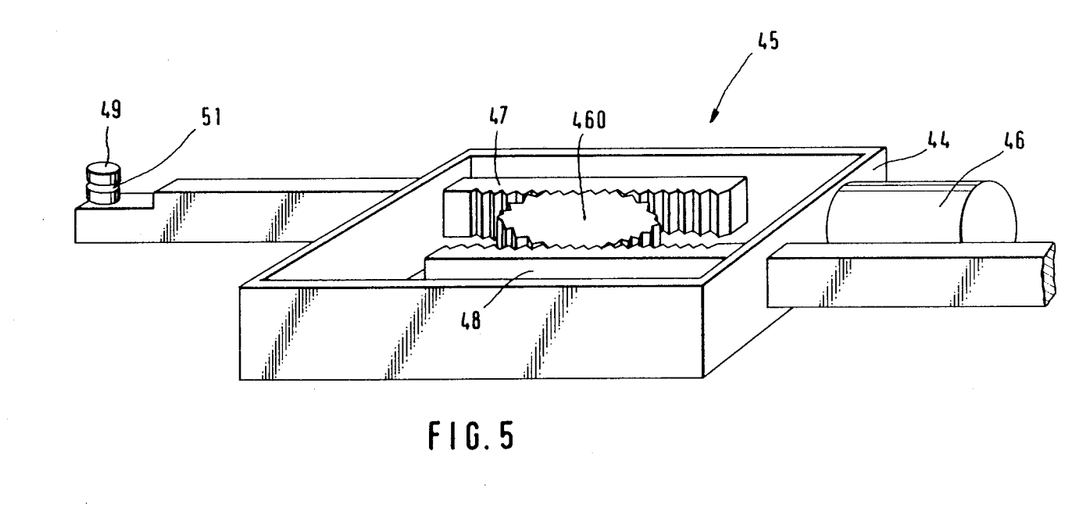
FIG. 5 is a perspective view, on a larger scale, of an operating means for the lever elements of the window shale of FIG. 1, using racks.

The operating means 31 mounted on the wall 6 of the base 4 has the structure schematically shown in FIG. 5. An electric motor 46 is flange-connected to one side wall 44 of an approximately cuboid gear box 45, and the output shaft of the electric motor leads into the interior of the gear box 45. There the output shaft drives a reduction gear, the output gear wheel 460 of which meshes with two racks 47 and 48. The two racks 47 and 48 mesh diametrically with the output gear wheel 460, in terms of the axis of rotation of this gear wheel, and upon rotation of the output gear wheel 460 both racks 47 and 48 execute a contrary movement. The two racks 47 and 48 are supported axially parallel to one another in the gear box 45 and are longitudinally slidable at right angles to the axis of rotation of the output gear wheel 460, with the aid of known guide elements, not shown in FIG. 5 for the sake of simplicity.

For the sake of geared connection with the coupling rods 28, the two racks 47 and 48 have a connecting pin 49 on their end protruding from the gear box 45, and the corresponding coupling rod 28 is mounted on this pin 49 with an eyelet. The coupling rod 28 is retained on the connecting pin 49 with a wave-type retention or holding washer, which is inserted into a cut-in groove 51 in the connecting pin 49 and holds the coupling rod 28 firmly against the rack 47 or 48.

OPERATION

Let it be assumed that the web 11 is roller up all way onto the wind-up roller 8 by the force of the spring motor 12, that is, the web 11 is located on the inside of the base 4, and the end rail 9 rests with its lower edge on the edge of the slot 10. In this position, the two lever elements 15 extend with their longer arms that engage the end rail 9 parallel to the wind-up roller 8, and also parallel to the end rail 9. Because both lever elements 15 are pivotably attached in the vicinity of the outer ends of the base 4, their plastic molded elements 32 in this position are located facing one another, spaced apart by a variable distance, in the vicinity of the middle of the base 4.

If beginning with this position of repose, or retracted or retention position the electric motor 46 is started up, then the output gear wheel 460 begins to rotate clockwise and pulls the two racks 47 and 48 into the gear box 45 by contrary motions. As a result, the two coupling rods 28 are moved toward one another and they pivot the extensions 26 of the two lever elements 15. At the same time, this causes the longer arms of the lever element 15, beginning at the position in which they extend parallel to the wind-up roller 8, to be pivoted away from the base 4, whereupon they rotate on the pivot pin 17. Since the free ends of the lever element 15 along with the plastic molded elements 32 are mounted in the groove 37 of the end rail 9, the pivoting movement of the lever elements 15 oriented away from the base 4 pulls the end rail 9 away from the slot 10, counter to the force of the spring motor 12, and pulls the web 11 out of the slot 10, simultaneously unwinding it from the wind-up roller 8. During the pivoting movement, the plastic molded elements 32 simultaneously move apart, that is, they move the free ends of the lever elements 15 away from one another and slide in the groove 37 of the end rail 9 toward its outer ends.

By means of this pivoting movement of the two lever elements 15, the web 11 is pulled out of the base 4 in a plane that extends at right angles to the pivot pins 17, that is, parallel to the pivoting plane of the lever elements 15.

As soon as the desired extent of extension is attained, the motor 46 is stopped, and the self-holding effect of the operating means 31 firmly holds the two lever elements 15 in the particular pivoted position in which they are located. The self-holding effect comes about, for example, because of the holding torque of the electric motor 46, in combination with the reduction ratio of the gear up to the output gear wheel 460. Additional brakes can therefore be dispensed with.

In order to avoid vibration of the lever elements 15 and thus of the web 11 about an axis parallel to the wind-up roller 8 in the fully extended position of the web, two holding elements 53 are provided at the location occupied by the end rail 9 when the window shade 3 is fully extended, that is, preferably on the upper edge of the rear window 2; these holding elements 53 have the form shown in detail in FIG. 4. The holding elements 53 are approximately cuboid and they contain a groove 54 of approximately V- or trapezoidal shape, open toward the base 4, and the end rail 9 comes to rest with its top 41 in this groove 54. The fastening of the holding elements 53 is effected for example by means of screws, which are inserted all the way through bores 55 into the vehicle body, or are secured to the rear window 2 by being glued. In the fully extended state, the end rail is thus captive in the grooves 54, without play, and the biassing force of the lever elements 15 assures that it rests firmly in the groove 54. V-shaped opening of the groove 54 oriented toward the base 4 facilitates introduction of the end rail 9 whenever a rough road surface causes the the window shade 3 to vibrate during the extension process. Alignment tolerances are also compensated for by this provision.

For retraction of the window shade 3, the operating means is set into motion in the opposite direction, and the output gear wheel 460, driven by the electric motor 46, advances the two racks 47 and 48 in opposite directions out of the gear box 45. As a result, the arms 26 are provided with a corresponding pivoting motion, which causes the longer arms of the lever elements 15 likewise to fold back in a pivoting movement toward the base 4. At the same time, during this pivoting movement, the free ends of the lever elements 15 with the plastic molded elements 32 move toward one another in the groove 37 and thus cause the end rail 9 to approach closer to the base 4. The spring motor 12 provided in the wind-up roller 8 at the same time turns the wind-up roller 8 in the winding-up direction, which winds up the web 11.

In each position of the lever elements 15, they support the web 11 in a direction in which the web itself has virtually no rigidity, namely at right angles to the plane of the web. Hence additional guide devices that are located firmly before the window 2 and that would still be visible when the window shade 3 is retracted are not needed for guidance of the end rail 9. Instead, the extension structure producing the guide function, in the form of the lever elements 15, disappears from the visible area to the extent that the web 11 is wound up on the wind-up roller 8 in the interior of the housing-like base 4.

This retaining and guidance function for the end rail 9 is brought to bear by the two lever elements 15 even when the window shade 3 is sharply inclined.

The retraction process is ended once the end rail 9 finally rests on the slot 10. The operating means 31 is stopped when it reaches this position, in which the two lever elements 15 again extend with their longer arms parallel to the wind-up roller 8.

To enable adjusting the two lever elements 15 to the same angular position, either one or both of the coupling rods 28 includes a length compensation device 56, shown in FIG. 1, which is embodied similarly to a turnbuckle; alternatively, for the sake of adjustment and balancing of the angular position of the two lever elements 15 on the base 4, the operating means 31 can be displaced parallel to the wind-up roller 8 and fixed in the desired position.

In the exemplary embodiment of FIG. 1, the two lever element 15 are pivotably connected in the vicinity of the outer ends of the base 4 and together have a length that is less than the spacing between the two pivot pins 17, so that the lever elements 15 can travel in the same groove of the end rail 9. However, a prerequisite of this arrangement is that the extension length of the web 11 is correspondingly small. If greater extension lengths are required, that is, lengths longer than half the distance between the two pivot pins 17, then the two pivot lever elements 15 are journalled in different planes on the base 4 and travel with their free ends in correspondingly offset grooves of the end rail 9, with one groove in the end rail 9 being associated with each of the two pivot lever elements 15. With the shade retracted, that is, in the position of repose, or retracted or retention position, the two lever elements 15 then rest with their longer arms practically over one another, and during the extension process they move from this position toward the associated outer end of the end rail 9.

Figure 6:
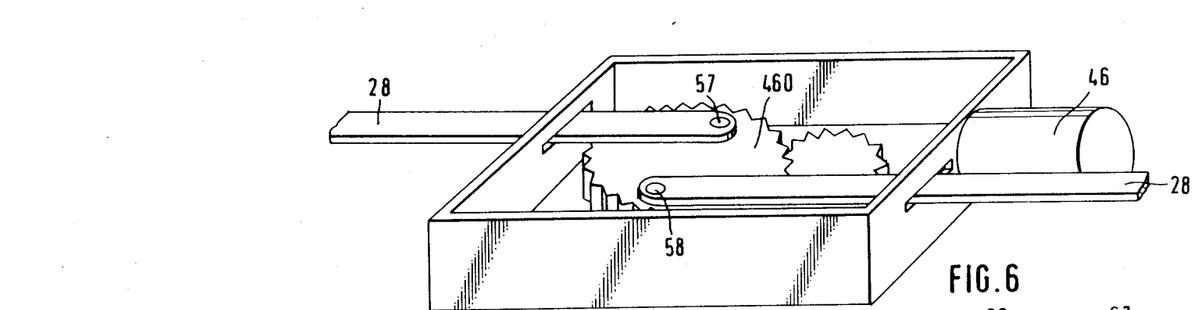
FIG. 6 shows an operating means for actuating the lever elements of the window shade of FIG. 1, using a crank drive.

Embodiment of FIG. 6:

Another form of the operating means is shown in FIG. 6, the version of FIG. 6 differing from that of FIG. 5 in that racks 47 and 48 are not used. The output gear wheel 460 instead has two crank pins 57 and 58 diametrically opposite one another in terms of the axis of rotation of the output gear wheel 460, and the coupling rod 28 are suspended directly from these crank pins with suitable eyelets. In this embodiment as well, the coupling rods 28 are provided with a contrary movement in their longitudinal direction, which when the electric motor 46 is switched on then causes the two lever elements 15 to pivot correspondingly.

Figure 7:
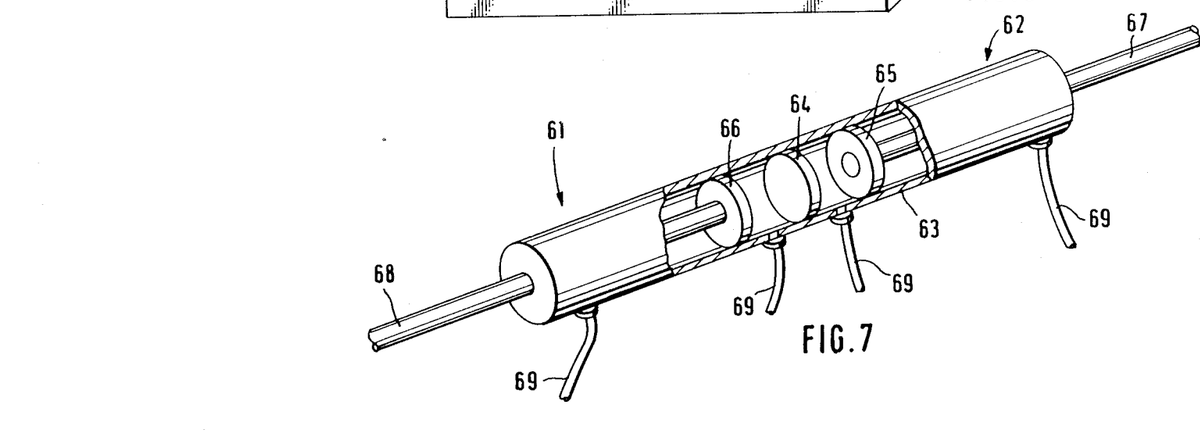
FIG. 7 shows two bidirectional pressure cylinders for actuating the lever element of the window shade of FIG. 1.

Embodiment of FIG. 7:

In motor vehicles which already contain pneumatic controls for other purposes, it suitable to provide as the active member of the operating means 31 two bidirectional pneumatic pressure cylinders 61 and 62, which for example may be formed in one shared cylindrical tube 63, the cylinders being divided from one another by a partition 64 in the middle. Two pistons 65 and 66, the piston rods 67 and 68 of which are extended in a sealed manner out of the cylindrical tube 63, slide in the resultant cylinder sections. The piston rods 67 and 68 are pivotably connected to the coupling rods 28, which lead to the lever elements 15. By supplying compressed air or negative pressure via connections 69, the pistons are selectively moved inward toward the partition 64, or outward toward the face ends of the cylindrical tube 63, and so their piston rods 67 and 68 execute movements in opposite directions, and these movements in turn operatively pivot the lever elements 15.

Journalling the lever element 15 on the outer ends of the base 4 has the advantage that the partially extended window shade 3 is largely resistant to vibrations about an axis that is located in the web plane and is approximately upright on the wind-up roller 8.

Figure 8:
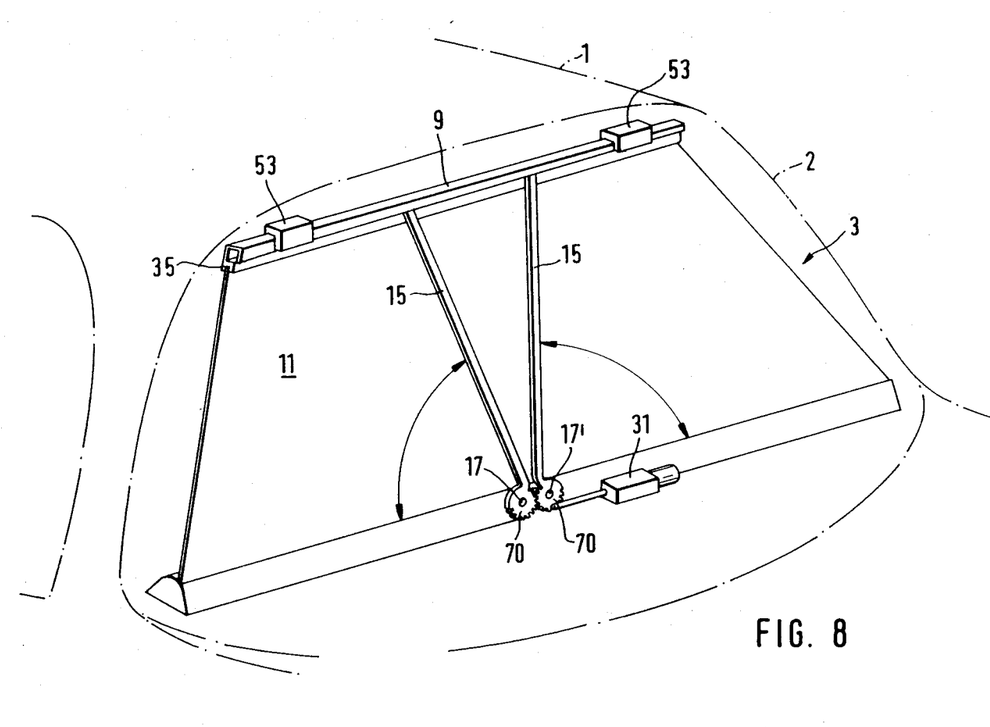
FIG. 8 shows a different embodiment of the window shade according to the invention, the two lever elements being pivotably journalled approximately in the middle of the wind-up roller.

Embodiment of FIG. 8:

In FIG. 8, another embodiment of the window shade 3 is shown, in which the two lever elements 15 are journalled directly beside one another on the base 4, in the middle of the longitudinal extension of the base, and in the vicinity of where they are journalled they are provided with gear wheels 70 that are concentric with the pivot pins 17. The spacing between the two pivot pins 17 is selected such that the two gear wheels 70 mesh readily with one anoter, so that when one of the two lever elements 15 is pivoted out of its position of repose into the upright position seen in FIG. 8, the other lever element also follows up this pivoting movement in the opposite direction. With this arrangement, it is possible for only one of the two lever elements 15 to be driven by means of the operating means 31, the drive of the other lever element being effected via the two gear wheels 70 that mesh with one another. Otherwise, the structure of the window shade 3 and operating means 31 is an described above.

Figure 9:
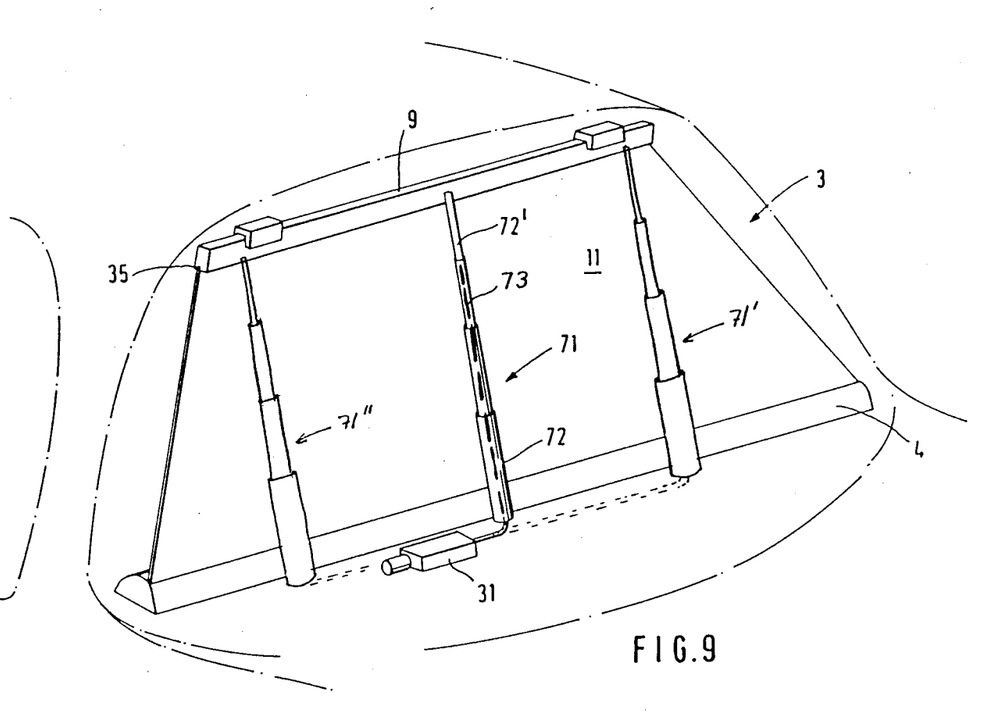
FIG. 9, again in a perspective view, shows a further embodiment of the window shade according to the invention, in which the extension structure is embodied by a telescoping rod.

FIG. 9, finally, shows a window shade 3 in which the extenion structure for moving and retaining the end rail 9 is formed by a telescoping rod 71, the foot of which is attached to the base 4 and which comprises a multiplicity of tubular telescoping members 72 that are movable within one another in telescoping fashion. The last or upper telescoping member is connected at its free end with the rail 9. The end rail 9 is a simple rod that contains only the groove 35 for receiving the web 11. A flexible-elastic slide member 73 is provided in the interior of the telescoping rod 71, being movable into the telescoping rod 71 by the operating means 31 or retractable out of the telescoping rod again, and its free end being connected to the uppermost telescoping member 72', which is attached to the end rail 9.

By setting the operating means 31 into motion, the telescoping rod 71 can be retracted or extended by means of the slide member, and accordingly the end rail 9 follows up the movement of the tip of the telescoping rod 71 and correspondingly pulls the web 11 out of the housing-like base or causes it to be wound up on the wind-up roller 8 in the base 4. The path of movement of the web 11 and end rail 9 in this embodiment is defined by the angle of inclination of the telescoping rod 71 which is secured such that it extends at right angles to the wind-up roller.

In the event that a single telescoping rod is too weak to enable bringing to bear the necessary forces for a sharply inclined web 11, it is aslo possible to attach two or more such telescoping rods 71' and along 71" the base 4 and thus along the end rail 9, and these telescoping rods can then be retracted or extended in synchronized fashion by means of the operating means.

The operating means and the flexible-elastic slide member 73 may be constructed as well known or in accordance with suitable prior art devices. For example, two suitable arrangements are described in German Patent Disclosure Documents DE-OS No. 32 36 400 and 34 15 930.

In all the embodiments of the novel window shade 3, the extension structures for moving the end rail 9 simultaneously bring to bear a retaining function in terms of the direction in which the web 11 does not have any rigidity at all. As a result, additional guide elements for the end rail 9 can be dispense with, and accordingly when the window shade 3 is in the retracted position, no guide elements or guide rails are visible in the vicinity of the window. The extension structures that hold the window shade 3 in its spread-open state are likewise retracted toward the base 4 and thus are out of sight.

Figure 10:
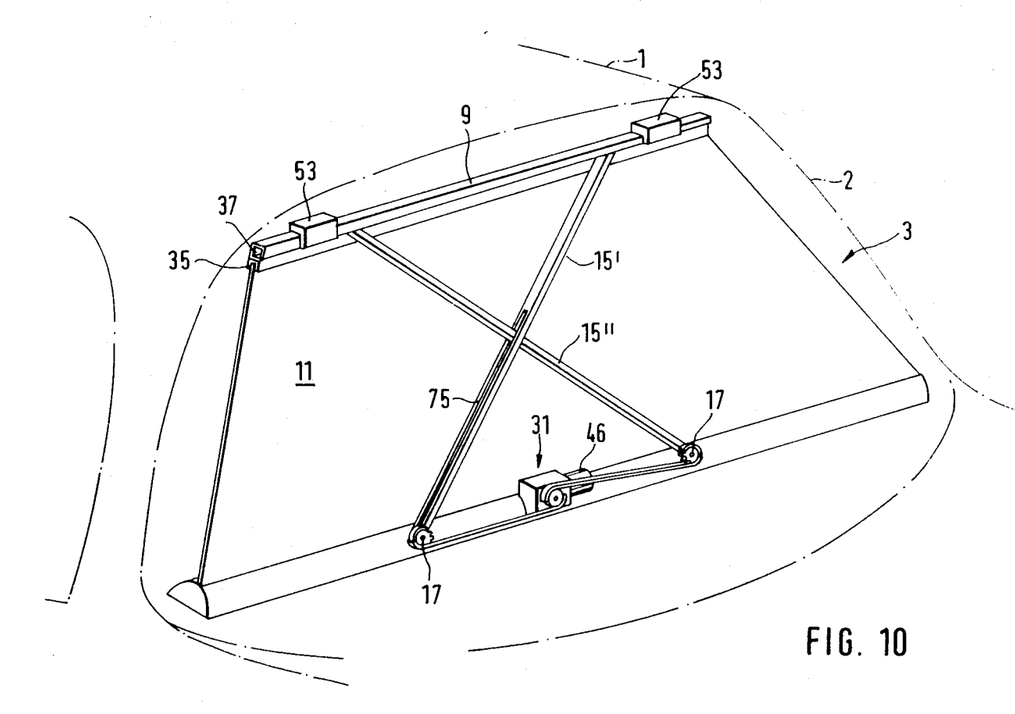
FIG. 10, in a perspective view, shows a window shade according to the invention located in a motor vehicle, having two lever elements movable in opposite directions, journalled such that they are pivotable over approximately one-third of the length of the base.

FIG. 10 shows a window shade 3 in which the journals for the two lever elements 15, that is, the pivot pins 17, are located approximately at one-third of the longitudinal extension of the base 4, measured from the particular adjoining face end. This arrangement has the advantage that the base 4 has nothing mounted on it is the vicinity of its ends and therefore can be mounted closer to the inside of the rear window 2 because the parts to be mounted, that is, the journals of the two lever elements 15, are located in the vicinity of the curvature of the rear window, in other words, where the curve of the window leaves more space for such devices.

To provide a sufficient extension path for the web 11, the two lever elements 15 are located crossing one another and they move in the same groove 37 of the end rail 9. For reasons of strength and to have as little impairment of symmetry as possible, the crossing of the lever elements 15 is provided such that one of the two lever elements, for instance the lever element 15', is provided in a corresponding region, approximately beginning at the pivot pin 17, in the direction of its free end that moves in the groove 37, with a longitudinal slot 75 through which the other lever element 15" passes.

Figure 11:
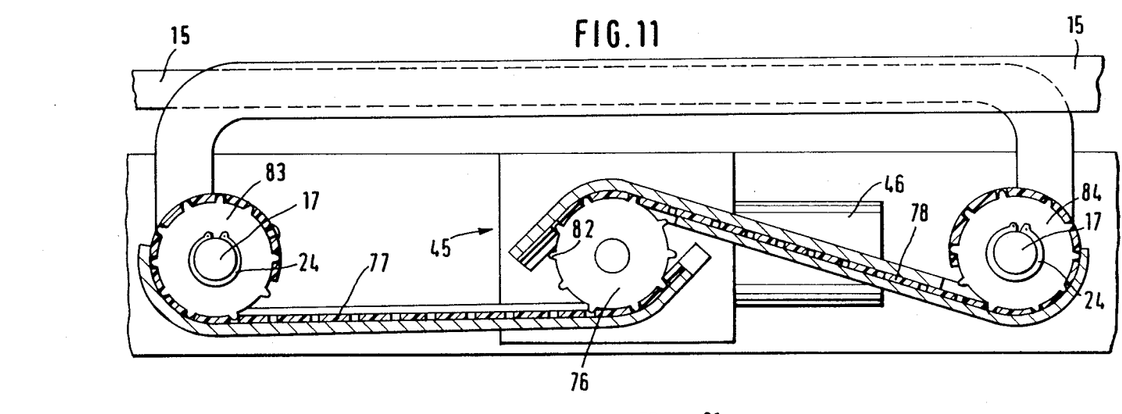
FIG. 11 is a plan view of the operating means for the window shade of FIG. 10.
Figure 12:
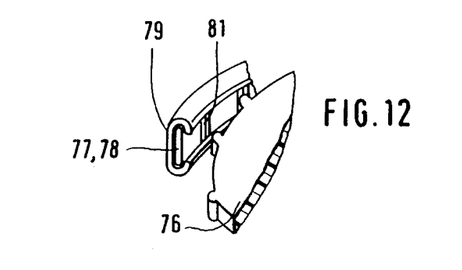
FIG. 12 in an enlarged perspective view of the guidance and drive of the perforated strip of the operating means of FIG. 11.

The operating means 31 is shown in detail in FIG. 11. Once again it contains a gear mechanism that is to be set into motion by an electric motor 46 and the output gear wheel 76 of which engages two perforated strips 77 and 78, which transmit the extension force from the operating means 31 to the two lever elements 15. As FIG. 12 shows on a larger scale, bot perforated strips 77 and 78 comprise a strip of plastic with a flat cross section, with equidistantly distributed rectangular openings the longitudinal axis of which is oriented at right angles to the longitudinal extension of the strip. These flexible-elastic perforated strips 77 and 78 are in a position, if they are guided in suitable approximately C-shaped guides 79 to transmit both tensile forces and, to a limited extent, compression forces. The guide rail 79 of C-shaped cross section and in which the perforated strip 77 or 78 is slidingly guided prevents the strip from buckling under pressure.

The drive of the two perforated strips 77 and 78 is effected by means of the output gear wheel 76, which has transporting teeth, or sprockets, 82 on its outer circumferential face that are matched to the openings 81 in the perforated strip.

Corresponding similar gear wheels 83 and 84 are connected to the two lever elements 15, at their base or pivot point, in a manner fixed against relative rotation, and these gear wheels are supported on the pivot pins 17 as described above. The wave-type retention washers 24 prevent the gear wheels 83 and 84 from sliding downward.

The guide rails 79 that guide the perforated strips 77 and 78 such that they withstand pressure extend on the one hand between the output gear wheel 76 and the gear wheel 83 and on the other between the output gear 76 and the gear wheel 84, and in both cases the guide rails 79 are guided around the gear wheels 83 and 84 over a circumferential angle of approximately 90°, and the teeth of the two gear wheels 83 and 84 pass through the slot-opening of the C-shaped guide rails 79 to engage the transport holes 81 of the perforated strips 77 and 78.

The guide rails are guided past the output gear wheel 76, as shown in FIG. 11, and as a result the two perforated strips 77 and 78 mesh with the output gear wheel 76 on opposite sides in terms of the axis of rotation of the output gear wheel 76. When the output gear wheel 76 is set in motion, in the counterclockwise direction, the two perforated strips 77 and 78 are therefore pulled toward the output gear wheel 76, causing the two lever elements 15, which are shown in FIG. 11 in their position of repose, to be pivoted outward in contrary movements. In this process the two perforated strips 77 and 78 becomes partially unwound from the gear wheels 83 and 84. For retraction, the output gear wheel 76 is set into clockwise motion, and the perforated strips 77 and 78 pivot the two lever elements 15 toward their position or repose shown. The compressive force required for this is relatively low, since the web 11 is already biassed in the wind-up direction by the spring motor 12, which already imparts a biassing force in the direction toward their position of repose shown in FIG. 11 to the two lever elements 15, assuming a sufficiently oblique position. This required compressive force can readily be brought to bear by the two perforated strips 77 and 78 in their guide rails 79.

For advancement of the end rail 9 of the web 11, there are two possible embodiments can be provided; in the one, one or two lever elements 15 are pivotably journalled in the vicinity of the wind-up roller 8, and in the other one or two telescoping rods 71 are firmly attached in the vicinity of the wind-up roller 8. The first version has the advantage that it is structurally simpler and simpler to manufacture than the second version, while with the second version longer webs are possible but more-uniform actuating forces are needed for extending the web.

The embodiment having lever elements can contain either one or two lever elements 15 of mirror-symmetrical structure and arrangement, and the version having two lever elements makes it possible to avoid uneven longitudinal forces in the end rail 9 if both lever elements 15 pivot in opposite directions, so that the friction arising in the end rail can be largely mutually overcome. In that case, a web 11 having a lesser lateral guidance force can also be used.

Tilting of the end rail 9 can largely be avoided if the lever elements 15, with their free ends, engage an extension of the web of fabric that is to be extended; this can be accomplished by providing that on their free ends the lever elements 15 have an extension 33 that protrudes at right angles to the plane of the web 11. If this extension 33 is furthermore laterally offset with respect to the longitudinal axis of the lever element 15, then the lever elements 15 can pivot very far back again, without hindrance from the end rail 9, until they attain a position in which they extend virtually parallel to the retracted end rail 9.

If the length of the web 11 is less than half the width of the wind-up roller 8, the two lever elements 15 can readily move along in the same groove of the end rail 9, in the case of a web 11 that is longer than half the wind-up roller width, a separate groove is suitably provided for each lever element, so that the lever elements 15 can travel past one another, because in that case they must be longer than half the distance between their pivot journal locations.

The drive of the lever element or elements 15, in vehicles that otherwise do not include any pneumatic or hydraulic drive, is effected by means of an electric motor, which via a gear drives one or more racks 47, 48, depending on the number of pivot lever elements 15, which are journalled longitudinally displaceably in the gear box 45 and are operatively coupled to the lever element or elements 15 via coupling rods 28. Another embodiment provides for the use of one or two cranks 30 or 57, 58, which are likewise operatively connected to the lever elements 15 via coupling rods 28.

In vehicles that already contain pneumatic drives for other purposes, the actuation of the lever elements 15 is preferably performed by didirectional pressure cylinders 61, 62, the piston rods 67, 68 of which are operatively connected in a pivotable manner to the lever element or elements 15.

When one or more telescoping rods 71 are used as the extension structure for extending the web 11, flexible-elastic slide members are advantageously included in the interior of the telescoping rod, and these slide members can be driven back and forth by the operating means 31, and their forward free end is connected to the last member 72' of the telescoping rod, so that extension or retraction is performed when the telescoping rod is moved forward or back.

To avoid vibration of the arrangement when the window shade is fully extended, such vibration preferentially occurring in the direction at right angles to the plane of the web 11, one or more holding elements 53 into which the end rail 9 moves can be provided at the end of the path of movement of the end rail 9. In this manner, the extension structure is anchored at both ends in the vehicle body when the web 11 is in its extended state.

The retention can be done between the holding element and the vehilce body, or in a V-shaped opening of the holding element.

Various changes and modifications may be made, and features described in connection with any one of the embodiments may be used with any of the others, within the scope of the inventive concept.

I claim:

1. A power operated window shade apparatus for a rear window in an automotive vehicle comprising:

a base support (4);

a screen web (11) having first and second ends;

a web wind-up roller (8) rotatably disposed on said base support, the first end of said screen web being secured to said web wind-up roller; springs means (13, 14) for biasing said web wind-up roller to wind said screen web on said web wind-up roller; and end support rail (9) to which the second end of said screen web is secured, said end support rail having a continuous groove (37) disposed therein;

web extension means engaged with said end support rail for extending said screen web and thereby defining a plane, said web extension means comprising a pair of elongated lever elements (15) having first and second ends, the first ends of said lever elements being pivotably secured to said base support and being pivotable back and forth between a retracted position and an extended position, the second ends of said lever elements having an extension element (33) disposed in and slidably retained within said continuous groove of said end support rail; said lever elements being resistant to bending in a plane perpendicular to said plane of said screen web when said screen web is extended and being movable in a plane parallel to said plane of said screen web when said screen web is extended; power operating mean (31) coupled to said lever elements, said power operating means pivoting said lever elements in synchronism for moving said screen web in said retracted and extended positions; and said lever elements solely guiding said end support rail, moving said end support rail between said retracted positions in which said end support rail is adjacent said web wind-up roller, and said extended position in which said screen web is extended, and retaining said end support rail and hence said screen web in a predetermined orientation with respect to a plane perpendicular to said plane of said screen web when said screen web is extended and parallel to said web wind-up roller.

2. The apparatus of claim 1, wherein the lever elements (15), in the retracted position in which the web (11) is wound up on the roller (8), extend approximately parallel to the roller (8).

3. The apparatus of claim 1, wherein each lever element (15) is pivotable about a pivot axis; and
the respective pivot axis (17) extends at right angles to the roller (8).

4. The apparatus of claim 1, wherein each extension element (33) is offset toward the extended position, with respect to the longitudinal extent of the respective lever element (15).

5. The apparatus of claim 1, wherein the extension element (33) defines a rear face; and
the groove (37) has a wall (42) which grips around the rear face of the extension element (33).

6. The apparatus of claim 1, wherein the lever elements (15) each comprises two-armed levers, one arm of which engages the end rail (9) and the other arm (26) of which is operatively coupled with the operating means (31).

7. The apparatus of claim 1, wherein the two lever elements (15) of the pair are mirror-symmetrical.

8. The apparatus of claim 1, wherein the support rail (9) is formed with two parallel continuous grooves extending longitudinally thereof, and
each of the two lever elements (15) is slidable in a respective groove.

9. The apparatus of claim 1, wherein
both lever elements (15) are slidable in the continuous groove (37).

10. The apparatus of claim 1, wherein the power operating means (31) pivots the respective lever elements in opposite direction.

11. The apparatus of claim 1, wherein the two lever elements (15) are journalled in the vicinity of the ends of the roller (8).

12. The apparatus of claim 1, wherein the two lever elements (15) are journalled in the vicinity of the middle of the roller (8).

13. The apparatus of claim 1, wherein the two lever elements (15) are directly operatively coupled together.

14. The apparatus of claim 13, including a gear wheel (70), each, coupled to a respective lever element (15), the respective gear wheel (70) being coaxial with respect to the respective pivot axis, both gear wheels (70) being positioned to mesh with one another, and wherein one of the lever elements (15) is coupled to the power operating means (31).

15. The apparatus of claim 1, wherein the power operating means comprises an electric motor (46), the output shaft of which is coupled to drive at least one rack (47, 48) longitudinally displaceably guided in a gear box (45), the rack being coupled to the respective levers (15).

16. The apparatus of claim 15, wherein two racks (47, 48) are provided coupled to an output gear wheel (460) of the reduction gear for driving the two racks (47, 48) in opposite directions, each of the racks being coupled to a respective lever element (15).

17. The apparatus of claim 1, wherein the power operating means (31) comprises an electric motor (46), the output shaft of which is coupled to drive a double crank means (57, 58), the crank means being coupled to the lever element (15).

18. The apparatus of claim 1, wherein the operating means (31) comprises at least one bidirectional pressure cylinder (61, 62), having piston rods, the piston rods (67, 68) being operatively connected to the respective lever elements (15).

19. The apparatus of claim 1, further including at least one holding element (53) which is attached in the vicinity of the window (2) and dimensioned and shaped to receive retain the support rail (9) when the web (11) is fully extended.

20. The apparatus of claim 19, wherein the holding element (53) has an approximately V-shaped groove (54), which open toward the wind-up roller (8), for receiving the end rail (9).

* * * * *